United States Patent [19]

Appleby et al.

[11] Patent Number: 4,864,519

[45] Date of Patent: Sep. 5, 1989

[54] INFORMATION TRANSMISSION SYSTEM

[75] Inventors: David Appleby, Beauchamp; Duncan M. Johnson, Barrow-on-Humber, both of England

[73] Assignee: Gent Limited, Leicester, England

[21] Appl. No.: 241,775

[22] Filed: Sep. 8, 1988

Related U.S. Application Data

[63] Continuation of Ser. No. 809,349, Dec. 16, 1985, abandoned.

[30] Foreign Application Priority Data

Dec. 18, 1984 [GB] United Kingdom ................ 8431883

[51] Int. Cl.[4] ........................ G08B 19/00; G06F 15/46

[52] U.S. Cl. .................................... 364/550; 364/138; 364/152; 364/200; 340/825.06; 340/506; 340/825.05; 340/825.36

[58] Field of Search ............... 364/505, 506, 550, 557, 364/481, 138, 140, 141, 148, 152, 579, 580, 200, 900; 340/577-579, 506, 508, 825.36, 825.05

[56] References Cited

U.S. PATENT DOCUMENTS

| | | | |
|---|---|---|---|
| 4,369,435 | 1/1983 | Adachi et al. | 340/577 |
| 4,432,064 | 2/1984 | Barker et al. | 364/550 |
| 4,435,704 | 3/1984 | Hashimoto et al. | 340/825.05 |
| 4,463,352 | 7/1984 | Forbes et al. | 340/825.36 |
| 4,498,082 | 2/1985 | Aldridge et al. | 340/825.05 |
| 4,538,138 | 8/1985 | Harvey et al. | 340/506 |
| 4,613,848 | 9/1986 | Watkins | 340/825.36 |
| 4,622,538 | 11/1986 | Whynacht et al. | 364/551 |

FOREIGN PATENT DOCUMENTS

| | | | |
|---|---|---|---|
| 0036276 | 9/1981 | European Pat. Off. | 340/577 |
| 0093872 | 11/1983 | European Pat. Off. . | |
| 78472 | 6/1962 | France . | |

OTHER PUBLICATIONS

Translator's Note on EP 093972 and French Patent No. 78,472.

*Primary Examiner*—Parshotam S. Lall
*Assistant Examiner*—Brian M. Mattson
*Attorney, Agent, or Firm*—Browdy and Neimark

[57] ABSTRACT

A driving device forming part of a controller is connected in a circuit and supplies power to a number of stations in the circuit. Each station has a microcomputer and at least one sensor capable of detecting a significant event of interest. Each microcomputer monitors its adjacent circuit, stores information derived from any sensor in its station and periodically informs the controller. The stations each have at least one circuit breaker controlled by its microcomputer for isolating that station from an adjacent station. The controller interrogates all the stations to identify any station at which an event has occurred and receives, stores, and analyzes data from the microcomputers and sends instructions thereto.

22 Claims, 1 Drawing Sheet

INFORMATION TRANSMISSION SYSTEM

This application is a continuation of application Ser. No. 809,349, filed Dec. 16, 1985 now abandoned.

FIELD OF THE INVENTION

This invention relates to an information transmission system for building management and which may, for example, include automatic fire detectors such as smoke and heat detectors.

DESCRIPTION OF THE PRIOR ART

Fire detectors are generally two-state devices connected in parallel along a single pair of zone wires covering all or a portion of a building. The first detector to change its state within a zone establishes a lower voltage, or a higher current on the zone wires, to initiate an alarm at a fire alarm panel. Plural alarm outputs, most commonly bells or other sounders, are generally wired in sectors which correspond with or are related to the zones. All the bells of a given sector ring on the activation of an alarm in the sector.

In spite of the established efficiency and reliability of such systems, certain shortcomings have been recognised for some time, in particular:

(i) The inability to recognize which individual device has changed its state, without wiring each detector in its own zone, which would usually be prohibitively expensive. This is particularly undesirable in multiple occupancy buildings such as blocks of flats or hotels, where it would potentially reduce loss of life and property damage if the precise site of a fire could be rapidly identified.

(ii) The crudeness of the way in which the change of state of a two-stage detector has in the past been interpreted has made it difficult to distinguish between a true fire and a false alarm, and it has also been difficult to monitor the operational state of detectors for maintenance purposes.

(iii) The general requirement in fire alarm systems for high integrity, particularly in terms of speed of response and security of wiring standards, has made it difficult to integrate other building servies with fire detection and alarm systems.

A number of proposals have been made in recent years to overcome some or all of the above disadvantages. These include the use of two-state detectors whose individual locations can be identified by sequential digital addressing or the recognition of more than the two detector signal states by using digital transmission techniques such as pulse width, pulse position or pulse code modulation, or by the use of an analog current or voltage imposed on the signal wires.

It is an object of the present invention to provide an improved building management system which provides full addressability to each detector, and has good security and speed of response to environmental change and sufficient flexibility to be used for a wide range of building management systems which may incorporate various detection and control functions.

Some detailed aspects of the present invention represent modifications or improvements of the disclosures of EP 0093872 A1 and French Patent No. 78472.

In this specification the terms "microcomputer", "sensor" and "station" are to be understood as having the following meanings:

Microcomputer

Any electronic device capable of carrying out a set of logic actions, which may be dependent on or independent of inputs from external components, and which use a pre-programmed set of instructions. The term includes a complete unit on a single chip of silicon as well as a collection of separate components including a microprocessor, memory and logic elements. It is also taken to include any programmable logic device, such as a custom array of logic gates, which is capable of carrying out the same functions.

Sensor

Any device for the conversion of a physical parameter to an electrical signal.

Station

A unit incorporating a microcomputer and at least one sensor.

SUMMARY OF THE INVENTION

According to the present invention, there is provided an information transmission system comprising a plurality of sensors in a circuit connected to a driving device which supplies power to energize the sensors. The circuit incorporates a plurality of circuit breakers for breaking at least one part of the circuit to isolate that part from an adjoining part. The circuit incorporates a plurality of stations, each station including a microprocessor. The microcomputers periodically monitor the integrity of those parts of the circuit connected to their stations, and monitor, interpret and store information derived from any sensor incorporated in that station, and further determine from that information if an event affecting a change in the ambient environment at that station has occurred. Each station has at least one of the circuit breakers, operationally controlled by its microcomputer to isolate that station from an adjacent station. A controller incorporating the driving device is arranged to interrogate all the stations to identify any station at which an event has occurred, to analyse data relating to such event, and to generate and send instructing signals to the station microcomputer.

BRIEF DESCRIPTION OF THE DRAWINGS

The invention will now be described by way of example with reference to the accompanying drawings, in which:

Referring to FIG. 1, a loop 1 having twin wires 1*a* and 1*b* incorporates a plurality of stations 2 connected therein. The ends 3 and 4 of the loop are connected to a controller 5 which may conventionally contain line drivers 6 and a loop driver 6*a* which is connected via a bus 7 with a loop processor 8. It will be understood that a plurality of further loops 1 may be connected to additional groups of line drivers 6, a loop driver 6*a*, and a loop processor 8. Each loop processor 8 is connected over a bus 9 with a process controller 10. Each of the units 8 and 10 contains a microprocessor.

As shown in FIG. 2, each station 2 contains a CMOS microcomputer 11, a power interface 12, a latching circuit breaker relay R the contacts of which are shown at 13, a serial interface 12a which comprises serial data inputs and outputs (not shown) and a sensor 14. The microcomputer 11 may, for example, be that sold under the Registered Trade Mark "Motorola", having a type number MC 146805 F2 which is a single chip CMOS design with 1089 bytes of ROM, 64 bytes of RAM and 20 input/output lines. The contacts 13 are connected in the wire 1a and the wire 1b is connected to the microcomputer 11. The latter is also connected across the contacts 13 via the serial interface 12a and operation of the relay R and its contacts 13 is controlled by the microcomputer 11.

It will be understood that each station 2 is defined herein as including a microcomputer and generally at least one sensor which may, for example, be a smoke sensor, a heat sensor or a manually operable alarm switch. Other types of sensor may also be used, and it will be assumed that such sensor is electrically connected to the microcomputer 11.

Figure 3:
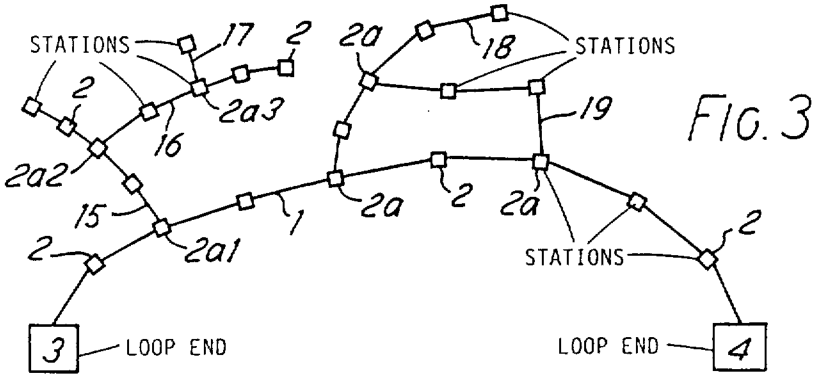
FIG. 3 shows a more elaborate loop.

FIG. 3 shows how the basic loop 1 can be modified to include spurs 15, 16, 17 and 18 and sub-loops such as 19. This enables the wiring plan to be arranged as nearly as possible to follow a building plan resulting in minimum cable runs. It can also readily be altered if the building layout is changed.

Figure 4:
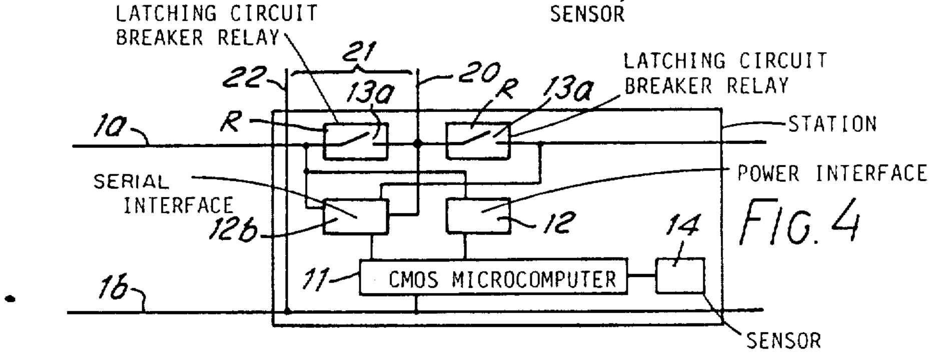
FIG. 4 is a view similar to FIG. 2 showing a latching relay at a station incorporating a T-junction.

With the arrangement of FIG. 3, a number of T-junctions are created at selected stations 2a. As shown in FIG. 4, two relays R have their contacts 13a capable of isolating the wires 1a on either side of the station 2 from each other and from a wire 20 of an additional pair of wires 21, the other wire 22 of which is connected to the wire 1b. The microcomputer 11 is connected via the serial interface 12b across both contacts 13a.

The Stations

It is known that at least 250 stations can be connected to a single pair of wires carrying both signals and power. A wide variety of wiring plans can be adopted, although a single loop 1 with each end connected to individual line drivers 6 is preferred. The CMOS microcomputer carries out a wide range of functions including serial communication, decoding and execution of action commands, and synchronisation and control of analog-to-digital conversions for the signals from all the sensors in the station.

It is also capable of monitoring that part of the wiring circuit (loop, sub-loop or spur) associated with the station for short circuit faults and of automatically isolating such faults, as will be described later, by means of the contacts 13, 13a.

Each station has a unique address which is allocated by the controller 5 and is stored in RAM. As well as this unique address, all stations can respond to one or more universal addresses, and groups of stations can be allocated common addresses.

Once all the stations have received their unique addresses, they can be accessed randomly using a three byte protocol: address, command and reply. If a baud rate of 4800 is used this allows interrogation of each station every 9.8 ms. Actions by the stations, for example, analog-to-digital conversions, are generally performed during the period when other stations are being addressed. When no action is required, the microcomputer in each station lapses into a low power WAIT mode until the next addressing thereof.

The Controller

The microcomputers of the process controller 10, the loop processors 8 and the loop drivers 6a may respectively be those sold under the Registered Trade Mark "Motorola" having type numbers MC 6809 and MC 146805. The line drivers 6 are optically coupled to but electronically isolated from the loop driver 6a. The loop driver 6a and the loop processor 8 each share a common area of memory through which information is transferred.

The loop driver 6a briefly halts the loop processor 8 when it wishes to read or write to this shared memory. For the majority of the time, however, the microcomputers (in 6a, 8) operate independently. The loop driver 6a removes from the loop processor 8 the routine operations of handling the loop 1 and maintaining the 9.8 ms addressing intervals from which the stations 2 derive their timings. Its prime function is that of serial data input/output from the line drivers 6. In addition, it carries out all the routine checking of replies from the stations 2 and automatically reacts to open circuit or short circuit faults on the loop 1. It also stores the station addresses that must be sequentially interrogated.

The Loop Processor 8 has the following principle functions:

(i) On power-up of the system it carries out the initialization (addressing and identifying the stations 2) and mapping of the loop 1. It also regularly checks the loop and acts accordingly.

(ii) It controls the loop driver 6a, providing it with an address map of those stations 2 which must be regularly interrogated for status and other specific address/command sequences.

(iii) Its most important function is the analysis of returned data from those stations 2, the sensors 14 of which have detected a significant event, and the conversion of this data into a simple form which can be passed to the process controller 10 for correlation and decision making. It is convenient to arrange for the program of the loop processor 8 to return a normalized number which corresponds to the probability of a significant even having occurred.

(iv) The loop processor 8 communicates with the process controller 10 and provides the essential interface between the process controller 10 and the loop driver 6a for the transfer of action requests and messages to the stations 2.

The process controller 10 is the controlling microcomputer for the controller 5. Its prime functions are as follows:

(a) It acts as the bus 9 controller, routinely interrogating the loop processors 8 for their status. In this role it carries out the overall fault monitoring of the system.

(b) On the basis of the values returned by the loop processors 8, it decides whether to actuate an alarm. It also has the capacity of testing against a pre-programmed alarm threshold a correlated value derived from the sensor outputs of a number of stations which are geographically near neighbours.

(c) If an alarm condition is sensed, it carries out the appropriate series of actions on the basis of a pre-determined sequence. These could include the full range of actions which the system is capable of performing, e.g. on a fire protection system:

(1) actions on stations, e.g. alarm sounders, message displays, discharge of extinguishants, disabling of lifts, etc.;

(2) actions on direct alarm circuits, e.g. a master alarm;

(3) the display of lights and other information at the controller 10;

(4) the operation of a direct link to a manned center or a telephone autodialler; and (5) communications with a master processor in order to report the alarm or download real time information for data logging.

(d) It could also carry out other control functions on general building management systems, such as environmental control and plant monitoring.

(e) It stores a duplicate of the essential loop maps, in a non-volatile memory, in order to prevent accidental loss of information, for example, by the removal of a microcomputer card from a loop processor.

Address Allocation

In order that stations can be interrogated and commanded individually, each must have a unique number associated with it in some manner. This is known as the station's primary address. In some previously known systems, this primary address is often set up manually using mechanical switches or links on a printed circuit board, which can be prone to human error.

An alternative method, disclosed in the above-noted EP 0093872 A1, is to arrange that all so-called measuring points in a system contain an address memory and can be individually isolated from one another by a circuit breaking device. With all of the circuit breaking devices open, an address is transmitted from a signal center to the measuring point closest to the signal center. The measuring point is arranged to latch this address, to which it will thereafter respond, and automatically close its circuit breaker to connect the next receiver in line to the signal center. The signal center transmits a new address, and the process continues until all the measuring points have been so addressed. This latter method is also prone to errors, since the only means of guaranteeing that an address has been successfully received is by detecting the current surge when a circuit breaker is closed and the next measuring point is powered. There is also no certainty that a detector has been given the correct address, or that two or more measuring points have not received the same address, such as could happen if circuit breaking devices were closed or short circuited.

In the present invention, the addresses are allocated to the stations 2 in a sequential manner. However, the aforementioned problems are overcome because the microcomputer 11, in each station 2, not only contains address memories, but also has the ability to respond to common addresses as well as its own address. Furthermore, it can monitor the voltage states of the circuit on each side of its circuit breakers. The whole process of address allocation remains under the control of the loop processor 8, which checks each stage, before proceeding to the next station. Compared with previously known methods, this method is less liable to human error (since there are no switches to set) and provides a near absolute certainty that each station has been successfully allocated a unique address. Furthermore, by allowing the primary addresses to be subsequently altered repeatedly, under control of the loop processor, a further level of security is added to protect against malicious intent.

The sequence of events which allows primary addresses to be so allocated in a secure manner is as follows:

1. As station 2 sequentially receives power from the loop 1, its microcomputer 11 accordingly performs a power-on reset routine, which includes setting up a default primary address of 0. It will be understood that the contacts 13, 13*a* of its relays R are guaranteed to be open by virtue of the station having been previously powered down.

2. Using primary address 0, the loop processor 8 commands the first station 2 to change its primary address to the next one in the allocation sequence of the looop processor 8 for example, primary address X. Henceforth, this is the only primary address to which the station will respond. By the replies received to this command, the loop processor 8 verifies that the station 2 has been allocated the correct address.

3. Using primary address X, the loop processor 8 now requests the serial line status of the station. The reply provides, among other information, the signal levels on the serial interface 12*a*, 12*b*. If the contacts 13, 13*a* are open and there are no hardware faults, then only one input of the serial interface 12*a*, 12*b* will read "high".

4. Again, using primary address X, the loop processor 8 now performs a second interrogation to find if there are one or two relays R at the station (i.e. whether it incorporates a T-junction as in FIG. 4).

5. If the reply to (4) indicates a T-junction station then the reply to (3) is then used by the loop processor 8 to decide which relay R to close first in order to power-up the next station in the circuit. The station is then commanded to close the appropriate contact.

6. A second serial line status request is performed on address X to confirm that the appropriate relay contact has been closed successfully.

7. The next station on the circuit is powered-up and the whole sequence repeated.

If, during steps (3) and (6), an unexpected serial line status is received indicating that either a relay contact is permanently short circuited, or is open circuited, then the allocation sequence is aborted and an appropriate error message may be displayed.

If, during steps (1), (2) and (3), there is a hardware fault on the station whereby the relay contact is short circuited, then two or more stations could be powered-up simultaneously and respond to the commands and interrogations from the loop processor. This produces a situation known as multiple allocation.

In order to detect multiple allocation, the protocol of the serial line status byte has been designed such that in the reply byte representing the signal levels on the serial interface 12*a*, 12*b* the bits are "logic anded" together when multiple stations reply simultaneously. This has the effect of producing either (a) an illegal condition, or (b) a transmission parity error when multiple stations reply. Again, under these circumstances, the allocation will be aborted with the appropriate error message.

It will here be understood that the power interface 12 and serial interface 12*a* or 12*b* enable the first station 2 in the circuit to receive power from and communicate with the controller 5 when the respective contacts 13 or 13*a* at the stations are open. Furthermore any station with its contacts open for (for the station of FIG. 2 or FIG. 3, respectively) can be powered and communicate with the controller 5 when the contacts of all the stations between that station and the controller 5 are closed.

Timed Analog-to-Digital Conersions and Thresholds

Each station 2 has provision for up to six sensors having analogue outputs. The microcomputer 11 is programmed to perform analogue to digital conversions on the outputs at one of five different fixed rates. Associated with each of the analog inputs to the microcomputer 11 there is also a separately programmable threshold.

On power-up, the loop processor 8 programs the microcomputer 11 to the required conversion rates and threshold settings. After waiting for a conversion to be performed on each input, the loop processor 8 then requests the results of these conversion. As the results are returned to the loop processor 8, they are stored in the microcomputer 11 as what is herein termed as "last transmitted" values, namely the first converted values representing the sensor outputs.

The station microcomputer 11 then continues to perform conversions at the programmed rate, each result being compared with its associated "last transmitted" (i.e., stored) value. If the absolute difference between the two values is greater than (or equal to) the programmed threshold, then the threshold has been exceeded. The microcomputer 11 then updates its status byte to indicate that a threshold has been exceeded.

The microcomputer of the loop driver 6a regularly interrogates each station 2 for its status byte and recognizes if a threshold has been exceeded and informs the loop processor 8. The latter then performs a series of readings from the associated microcomputer 11 allowing it to decide by further processing of the readings whether the tripped threshold represents a significant event and takes appropriate action. As the loop processor 8 performs the readings, the "last transmitted" values (i.e.; the values stored) are updated within the microcomputer 11 and the whole process is repeated.

The ability of the microcomputer 11 to automatically perform regular analog-to-digital conversions on up to six analog inputs and also to filter the results within programmable limits significantly reduces the signal loading on the overall systems and allows it to respond very quickly when an event does occur.

Fast Search Facility

The microcomputer of the loop driver 6a automatically interrogates each station 2 in the system in a sequential manner. If there is no "activity" on the system (i.e. the loop processor 8 is not issuing commmands) then each station 2 takes 9.8 msecs. to be interrogated and the worst case response of a full loop is 250×9.8=approx. 2.5 seconds. If there is some activity on the system (e.g. thresholds are tripping because of environmental changes) then only every other 9.8 ms timeslot is available for sequential interrogation and the worst case response increases to 5.0 secs. This delay is unacceptable in many types of systems since 1.0 seconds is the longest acceptable delay for fire detection systems.

Methods have been previously described aimed at overcoming this delay. In the above-noted one such method disclosed in French Patent No. 78472, a group of so-called secondary stations is selectively searched by broadcasting instructions which selectively subdivide the group until only a single secondary station remains, which can then transmit its message. Each secondary station which has a message to report, and whose own identity lies within a range of identities defined by the broadcast instruction, responds with its own encoded signal. Where two or more secondary stations so respond, within a common timeframe, the resultant corrupted signal may be detectable. By modifying the broadcast instruction the group of responding secondary stations may be selectively narrowed until it is certain that an uncorrupted signal is received.

The information transmission system according to the present invention can incorporate a fast search facility which improves significantly on this known method, in that it does not rely on the ambiguous detection of corrupt replies. This is possible because the microcomputer 11 of the station 2 is able to synchronize its replies with those of other stations.

When commanded or interrogated, a station 2 produces an accurately-timed reply which appears in a fixed timeslot within the address/command/reply period. Using this feature and a special limited-reply protocol, it is possible for a group of stations 2 to reply simultaneously without data corruption i.e., no ambiguity as to how many and which stations replying.

All stations 2 have a fixed preset "fast search" address "255" to which they are able to respond. At programmable intervals, the loop driver 6a outputs address "255" followed by a special command, which may also be "255".

All stations 2 "listen" for this address, and then compare the special command to their own primary address. If a station's primary address is greater (in a simple numerical sequence of primary addresses 1 to 250) than the special command, then it will not reply. Otherwise, it checks its status byte and only if there is an event stored will it reply in the normal timed reply slot.

By outputting the fast search address 255, followed by special command 255, the loop driver 6a can therefore interrogate every station 2 on the system using a single address/command sequence. If one or more events are stored somewhere on the system, then the loop driver 6a will receive simultaneous replies from all the stations 2 concerned. It then enters a fast search routine to identify the particular stations 2.

This search routine works by changing the special command in order to "home in" on the stations 2 concerned. Hence, having received a reply from the sequence 255, 255, the loop driver 6a knows there is at least one event stored somewhere on the circuit. It next sends sequence 255, 128, to which all stations 2 with primary addresses less than or equal to 128 will reply (if they have a stored event). If a reply is received, then the event or events must be stored on stations 2 having primary addresses 1 to 128, and the loop driver transmits the sequence 255, 64 to scan the lower 64 stations. The lack of a reply indicates that the event is on station 129 upwards, and the loop driver transmits 255, 192 to scan stations 129 to 192. It then continues in a similar manner, taking decisions dependent on whether or not a reply is received as to which block of stations to scan next. The whole search takes nine "255-special command" sequences, and this is independent of the number of stations in the system. Two examples are as follows:

EXAMPLE 1

Event on station having primary address 19:

| Loop Driver | Station Reply |
|---|---|
| 255,255 | 19 replies |

-continued

| Event on station having primary address 19: | |
|---|---|
| Loop Driver | Station Reply |
| 255,128 | 19 replies |
| 255,64 | 19 replies |
| 255,32 | 19 replies |
| 255,16 | No Reply |
| 255,24 | 19 replies |
| 255,20 | 19 replies |
| 255,18 | No Reply |
| 255,19 | 19 replies, therefore event is on station 19. |

EXAMPLE 2

| Event on station 96: | |
|---|---|
| Loop Driver | Station Reply |
| 255,255 | 96 replies |
| 255,128 | 96 replies |
| 255,64 | No Reply |
| 255,96 | 96 replies |
| 255,80 | No Reply |
| 255,88 | No Reply |
| 255,92 | No Reply |
| 255,94 | No Reply |
| 255,95 | No Reply, therefore event is on station 96. |

It should be noted that the exact numerical order of the special commands, described above, is given by way of example only and other sequences could also be possible.

Thus with the aid of a common address, to which all stations can respond simultaneously, the loop driver is capable of determining with one interrogation whether an event has occurred on the circuit. By subsequent use of a fast search facility it can identify within nine interrogations which station has registered the event.

Prioritized Events

In the Fast Search facility described above, each responding station 2 replies with an event status byte which is divided into 4 pairs of bits. The lowest order pair (bits 0 and 1) indicate whether any threshold on any channel has been exceeded. These two, therefore, allow threshold events to be found by the fast search routine. Bits 2 and 3 may be used for other purposes. Bit pairs 4/5 and 6/7 indicate that an emergency event has occurred and has been latched by the station.

An emergency event is defined as a high-to-low transition on a special input pin (not shown) at each stations. The response to an emergency event is programmable into four levels of priority. Priority 4 effectively means that no action is taken as a result of the event—although it is automatically latched internally by the station 2. Priority 3 will cause the station 2 to store the event and respond only to the regular sequential interrogation, i.e. response is relatively slow and dependent on the size of the system. Priority 2 causes bits 4 and 5 to be cleared in the Event Status Byte and Priority 1 causes bits 6 and 7 to be cleared in the Event Status Byte. It should be noted that the Event Status Byte is configured in "bit pairs" to allow for the tolerance of the timed replies when several stations reply simultaneously during fast searching. This ensures that transmission errors do not occur because of such simultaneous replies.

The fast search routine also has the ability to search for the highest priority event currently stored on the loop. The Event Status byte is configured with bits "set" for no event and "cleared" when an event is stored. Hence, when several stations reply simultaneously, any event bit pairs (cleared) are logically "anded" with the other replies and therefore all events show up in the "anded" reply received by the loop driver.

Hence, the fast search routine searches not only for *any* event, but for the *highest* priority event on the system. An example is given below:

| Event Priority 1 on Station 35 Event Priority 2 on station 27 | |
|---|---|
| Loop Driver commands | Reply |
| 255,255<br>255,128<br>255,64 | Simultaneous from 27 and 35 - top 4 bits cleared. Loop Driver 6a recognizes that a search for Priority 1 event is required first. |
| 255,32 | Reply only from 27 - bits 4 and 5 clear. Loop Driver now knows that the Priority 1 event is on stations 33 to 64. |
| 255,48<br>255,40<br>255,36<br>255,34<br>255,35 | Loop Driver homes in on Priority 1 event - ignoring Priority 2. The Priority 2 event would be found during a succeeding fast search routine. |

The fast search method above provides a means to give a system response time independent of system size. By including prioritized searching, it adds a further level of sophistication, giving the ability to pre-define levels of importance of the different events.

Buffer Memory

The microcomputer 11 contained within each station 2 contains a feature whereby the timed analog-to-digital conversion resulting from one or more inputs to the microcomputer 11 are successively stored in digital memory such as a buffer. Each buffer typically contains 16 readings, the oldest being lost from the memory as the newest is written into it. When the result of an analog-to-digital conversion deviates by more than the pre-set threshold from the value previously transmitted by the station, the appropriate actions are taken by the station as previously described. Although this process can be fairly rapid, typically less than 1 second, the characteristic frequencies produced by the sensor signal at the station could well exceed 1 Hz. Because the frequency of the analog-to-digital conversions must be sufficiently rapid to 1 accurately convert the signal, then, in the absence of a buffer, by the time the loop processor 6a had identified the station 2 and started to call on the results of the analog-to-digital conversions, valuable information on the shape of the signal envelope which caused the threshold might well have been lost.

However, the presence of the buffer allows such information to be stored within the microcomputer 11 until the loop processor is able to respond to the event and call off and analyze the information. Such short timescale information would be of particular value with a number of environmental sensors. An example is an infrared flame sensor the detection mechanism of which responds to the flicker, typically in the 5 Hz to 30 Hz frequency band, in the level of infrared radiation emitted by the hot carbon dioxide gases released from burning organic materials, particularly liquid hydrocarbons.

Another example is a passive, infrared intrusion sensor in which the long wavelength infrared radiation level reaching the sensing element from the human body varies as the intruder moves through the various fields of view created by the sensor optics.

These two instances are given by way of example only, and do not preclude the use of other types of environmental sensor which can collect useful information for analysis over a timescale which is shorter than the minimum delay period for the local processor 11 to register an event and start collecting data.

By the continual storing of successive sensor readings, within a buffer memory at each station 2, the loop processor 6a has access to a series of readings preceding and immediately following the tripping of a threshold and signalling of an event. This permits the loop processor 6a to analyze event waveforms which would otherwise be lost in a conventional data transmission system.

Short Circuits

A major problem with two-wire systems which carry many sensors or detectors and may, for example, be responsible for detecting fires in a large building complex is the effect of a short circuit fault condition directly across the system wiring. Without making any provisions for such a fault condition, the whole system would effectively collapse and all fire protection would be lost.

The only way to overcome such a fault condition in the short term is operationally to isolate it from the rest of the system and then report the condition to the user to be attended to at the earliest opportunity.

Figure 2:
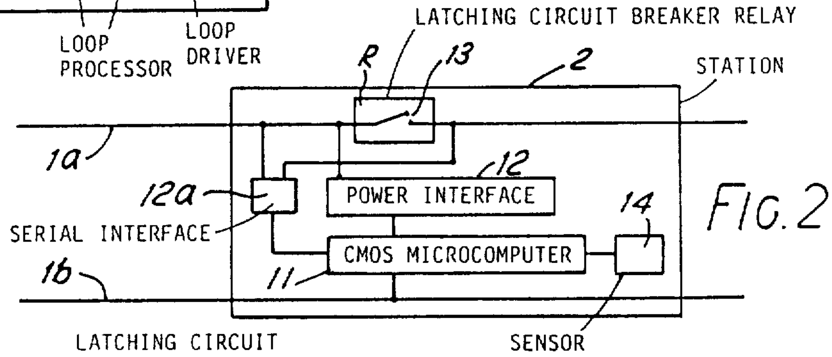
FIG. 2 shows schematically in block diagram form a station, incorporating a microcomputer and other components.

Each station 2 contains at least one magnetically-latching relay R having contacts 13, 13a which, when open, breaks the circuit through the station (see FIG. 2). Some special stations at T-junctions have two such relays 13a so that all three lines can be isolated (see FIG. 4). The operation of the relay(s) is under the control of the station microcomputer 11.

During normal system operation, the loop driver 6a outputs regularly timed address/command sequences and the stations produce timed replies. Hence, both loop driver 6a and stations 2 can predict when the signal level on the wiring should be a guaranteed high, namely at the end of the address and at the end of the command bytes. If a short circuit fault occurs, the signal level immediately drops to a low level.

From the occurrence of the fault condition, the loop driver 6a, by monitoring the length of time a low level exists on the loop, is guaranteed to have detected and confirmed it 12 ms later, when it switches both outputs to tri-state for a further 16 ms. Similarly, a station takes up to 22.8 ms to detect and confirm the same fault.

Having detected and confirmed the fault, each station 2 opens its relay contact(s) 13, 13a. Hence, approximately 25 ms after the fault occurs, the outputs of the loop driver 6a are tri-state and the isolation relay contacts 13, 13a of the stations are all open.

After the 16 ms delay, the loop driver 6a places the end 3 of one wire 1a of the loop 1 high. The stations 2 meanwhile are scanning their inputs waiting for a high level to appear. The station 2 nearest the end 3 of the loop detects the high on one of its inputs and immediately applies a pulse to the appropriate relay R to close its contacts 13 in order to apply the high level to the next station.

The next station 2 now detects a high on one of its inputs and performs exactly the same sequence. At the end of the relay operating pulse, the station also checks to see if the loop goes high again. If it stays low this implies that the fault position has been found and the station immediately opens the contacts of the relay R that it has just closed, thereby isolating the short circuit from previous stations.

EXAMPLE I

Figure 1:
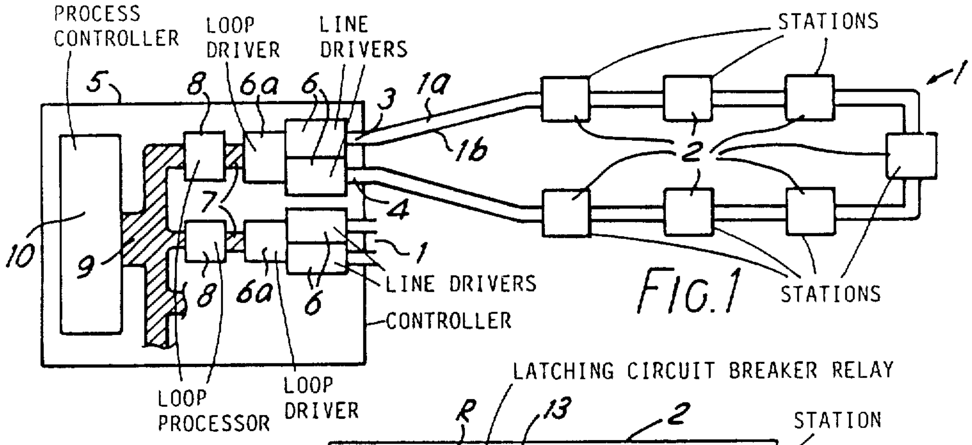
FIG. 1 shows, diagrammatically a loop of stations connected to a controller.

Consider the simple loop 1 of stations 2 as shown in FIG. 1. Assume a short circuit occurs at a position A (not shown) along loop 1. The fault is detected as described and all stations 2 between end 3 and position A open their isolating relay contacts 13. The loop driver 6a changes the line driver 6 from tristate at end 3 and end 4 to a high level on end 3 and tristate on end 4. The stations 2 between position A and end 3 go through the "detect a high" and then the "close relay contact" sequence, and as each relay contact closes, a 1.5 ms low is forced on the loop. The loop driver 6a is also monitoring end 3 of the line drivers 6 and detects the series of pulses informing it that the fault is still to be found.

Eventually, the station 2 next to position A closes its relay contacts, and releases the low previously forced on the loop 1a. However, the loop 1a remains low because of the short circuit at position A, which causes that station 2 to immediately open the relay contacts again, isolating the fault from one side. The remainder of the stations on the other side of position A are still waiting for a high.

The loop driver 6a now senses that the loop has remained steadily high for a pre-set period and hence knows that the fault has been found and isolated from end 3. It now switches end 4 high and the stations between end 4 and position A then perform the identical sequence of actions, with the station nearest position A isolating the fault from the other side.

The loop driver 6a again senses the lack of pulses on end 4 and reverts to normal operation, informing the loop processor that a short circuit has occurred.

EXAMPLE II

Consider the circuit shown in FIG. 3.

This configuration includes several T-junction stations 2a which are used to form spurs 15, 16, 17, 18 or sub-loops 19 in the wiring. Each T-junction station contains two relays R. If a short circuit occurs the detection of it is identical to a simple loop and after approximately 25 ms, the outputs of the line drivers 6 are tri-state and all the contacts 13 of the relays R in the stations are open.

End 3 is now switched high by the loop driver 6a and the first station 2 on the loop 1 detects the high, closes its relay contacts, and hence, applies a high to the first T-junction station 2a1 when the low level is released: this station now closes the appropriate relay contact to apply a high to the spur 15. The first T-junction station 2a1 must now wait until the stations on the spurs 15, 16 and 17 have all finished their operations (i.e. either found and isolated the short or closed their relays) before closing its second relay.

The reason it must wait is to prevent the situation whereby more than one station is "active" at the same time. If this was allowed (e.g. stations on the spurs are closing their relays at the same time as further stations on the loop 1), and the actual fault is found by one of the latter, then there is a good chance that the first station on the spur 15 would also sense that it had found the fault too and would re-open its relay contacts. Hence, although the fault would be successfully isolated, this station would have its relay contacts spuriously open and the remaining stations on the spurs 15, 16 and 17 would be lost.

There is, however, a further complication. When the first T-junction station 2a2 on the spur 15 receives a high, it closes the appropriate relay, applying a high to the first station 2 on the spur 16.

This station 2a2 must now also wait until the spur 16 has finished, before closing its second relay. There are now two stations in a "wait" mode, 2a1 and 2a2, and the one at the junction of the spurs 15 and 16 (2a2) must be guaranteed to close its second relay before 2a1 in order to prevent more than one station being "active" at the same time. These stations must, therefore, wait for different periods of time.

The wait period is defined as the length of a steady high on the circuit in units of 1.2 ms. The number of wait units is programmable and set up by the loop processor 8 during system initialization. Hence, during wait mode, stations are continually scanning the signal level on the circuit. When other stations are active (i.e. closing their relays) they are (as described earlier) forcing regularly timed low going pulses onto the circuit and it is these pulses that prevent waiting stations from going ahead. Only when activity has finished, and there is a steady high on the circuit for the number of 1.2 ms units programmed into the station, will it close its second relay, thereby presenting a high to the next station.

Returning to the example in FIG. 3, the first T-junction station 2a1 on the loop 1 would have to wait for 3 units, the station 2a2 at the junction of spurs 15 and 16 for 2 units and the 2a3 station on the spur 16 for 1 unit. Similar waiting would occur for the spur 18 and sub-loop 19. The T-junction stations do not respond to a high on the circuit connected to the sub-loop (20, FIG. 4) and hence the stations 2a in the loop 1 are only activated from stations in that loop.

The need for the wait periods in the stations also implies that a programmable delay is required in the loop driver 6a, in order to vary the delay between End 3 changing from tri-state to high and End 4 changing from tri-state to high. The loop driver 6a monitors activity on the circuit in a similar manner to the stations and looks for a steady high for the said delay before switching End 4 high (i.e. it must wait 1 delay unit longer than the longest wait set up on any T-junction station to ensure that activity has finished).

It should be noted that the method described would perform equally well with circuit isolation devices (not shown) other than relays. For example, combinations of semi-conductor devices such as a pair of FET transistors, connected in parallel in such a way as to permit a bi-directional flow of current in the ON state, could be employed. The timings given above for the sequence of events are also not fundamental to the method, but are given merely by way of example.

Thus, using the isolating relays in the stations and the processing power of the station microcomputers, the system can identify and rapidly isolate short circuit faults and subsequently identify their position.

Negative Resistance Line Driver

The system described in this specification uses only two wires in order to carry both digitally encoded signals both to and from, and power to, the stations. The use of digital signalling in which the circuit is switched over a wide voltage range, for example, where logic 0 is less than 5 volts and logic 1 is greater than 15 volts, provides considerable advantages in terms of noise immunity and simplicity of the signalling hardware at each station. In order to drive data at 4.8 K baud over long lines (e.g. >1 Km) of highly capacitive cable, such as is commonly installed on fire alarm systems, it is necessary to provide sufficient current to recharge the line to the logic 1 level in a period of time which is typically less than half of one data bit period (less than 100 us). Stations signal to the controller 5 by switching the circuit to the low state, and common practice would be to use either a series resistance or a constant current source at the line drivers 6 in order to supply current to the circuit.

Of these two options, the constant current source would be preferred, but a serious limitation of this is the current consumed during the logic 0 switching states. Building systems, such as fire protection systems and security systems, must run for extended periods (typically up to 72 hours) from standby batteries during periods of electricity failure, making low power consumption desirable.

In a conventional line switching system, the current drawn by the logic 0 switching could amount to a significant proportion of the total system standby current. This problem can be greatly minimized by the use of a line driver with a negative resistance characteristic. For a line driver with such a characteristic, the recharge time, T, of a line of capacitance C to a voltage V is:

$$t = SC \ln\left(1 + \left(\frac{V}{MS}\right)\right)$$

where

M=current at OV (A)

S=slope impedance (ohms)

For the case previously considered (C=0.5 μF, V=20 volts operating at 4800 baud), the constraint of recharge time within half of one data bit period could be met by a minimum current (M) of 30 mA, and a slope impedance (S) of 100 ohms, giving a maximum current of 230 mA. This represents an improvement in logic 0 switching current of a factor of 3.3 over the constant current case.

The negative resistance characteristic is only necessary during that period of the address/command/reply transmission sequence when the stations reply since this reply slot is accurately timed. The loop driver 6a can predict this and switch the line drivers 6 into the negative resistance mode only for this period. For the remainder of the transmission sequence the line driver 6 switches between a logic 1 constant voltage, high current state and a logic 0 state which consumes no standing current.

Thus, the line drivers 6 can each be programmed by the loop driver 6a into one of four states as follows:

State 1: logic 1 transmit—constant voltage, high current.

State 2: logic 0 transmit—zero voltage.

State 3: receive—negative resistance.

State 4: tri-state.

The overall characteristic of the line driver 6 permits a relatively high current to be supplied to the circuit. This can both power the stations and potentially provide a surplus for other purposes such as powering alarm sounders. It also permits highly capacitative cables to be recharged quickly, aiding the transmission of data. During logic 0 switching of the circuit by the stations it minimizes current consumption and also provides a defined logic 0 voltage state at the line driver 6.

Secondary & Tertiary Addresses

Together with a primary address as described above, each station can similarly be allocated and store a secondary address and a tertiary address.

When responding to a primary address, a station always produces a reply—be it status information or an acknowledgement of reception of a command byte—which is transmitted back to the controller 5. To avoid data corruption only one station must reply at the same time, which implies that a primary address must be unique to a particular station.

However, stations do not produce replies when addressed using their secondary or tertiary addresses. Hence, many stations may have the same secondary and/or tertiary addresses, which allows grouping of the stations to perform simultaneous actions.

A typical sequence of events could be as follows:

(1) On power-up, all stations have default secondary and tertiary addresses of, say, "253".

(2) The loop processor 6a allocates primary addresses—say stations 1 to 10.

(3) It then changes the secondary address of stations 1 to 5 to "100", using primary addressing to do so in order to obtain confirmatory replies from each individual station that the secondary address change has been successful.

(4) It similarly changes the secondary address of stations 6 to 10 to 101.

(5) Finally, it gives stations 1 and 2 the tertiary address 110.

By using address 100, the first 5 stations can be commanded to output a timed digital output pulse simultaneously (e.g. for pulsing a group of alarms) and address 101 can be used to turn on digital outputs on stations 6 to 10 simultaneously. A more powerful feature is to use tertiary address 110 to command stations 1 and 2 to perform an analog-to-digital conversion simultaneously with a pulsed output. Thus, station 1 could be the transmitter end of an infra-red beam detector and station 2 the receiver end, and as stations 1 transmits, number 2 can simultaneously perform an analog-to-digital conversion and gate the signal at the receiver end.

It will be understood that although, as described above and in accordance with the definition previously described each station incorporates a microcomputer and a sensor, it may be desirable to include in the circuit other units including a circuit breaker and a microcomputer but not incorporating a sensor. Such units may, for example, be data display devices or voltage control devices and they could be addressed, interrogated and instructed in exactly the same way as the stations.

What we claim is:

1. An information transmission system comprising a plurality of sensors for the conversion of respective physical parameters to respective electrical signals, a circuit connected to a driving device which supplies power via said circuit to energize the sensors, said circuit incorporating a plurality of circuit breakers connected in series in said circuit between respective parts of said circuit, each said circuit breaker acting to isolate at least one respective one of said parts of said circuit from an adjacent one of said parts, a plurality of stations connected in parallel with one another to said circuit, so that each said station is adjacent at least one other one of said stations along said circuit, each said station incorporating a microcomputer, at least one of said circuit breakers and at least one of said sensors, each said microcomputer periodically monitoring at least one respective one of said parts of said circuit adjacent its respective station, and monitoring, interpreting and storing information derived from said at least one sensor incorporated in that station, for determining from that information if an event has been detected by said at least one sensor at that station, said microcomputer at each said station controlling each said circuit breaker therein, for creating at least one open circuit between respective adjacent ones of said parts of the circuit operationally, to isolate that station from at least one adjacent one of said stations, respectively, and a controller incorporating said driving device being arranged to interrogate all of said stations to identify any one thereof at which one of said events has occurred, to analyze data relating to each such event, and to generate and send instructing signals to said microcomputer of each respective station concerning the respective sensed event.

2. A system according to claim 1, in which each said station in said circuit has a common address, and said controller comprises addressing means for allocating a unique primary address to each said station in said circuit.

3. A system according to claim 2, in which said addressing means is operable to allocate a unique group address to at least one selected group of said stations, said at least one selected group selectively including all of said stations.

4. A system according to claim 3, in which said addressing means is operable to allocate a plurality of said unique group addresses to respective groups of said stations, wherein each said station can be selectively included in at least two of said groups by allocation thereto of the at least two respective unique group addresses.

5. A system according to claim 4, in which said circuit incorporates a T-junction in at least one of said stations, each said station with at least one of said T-junctions incorporating at least two of said circuit breakers, each said circuit breaker of each said station with at least one of said T-junctions operating for selectively breaking at least one respective one of two of said parts of the circuit operationally, to isolate that station from a respective adjacent one of said stations if the microcomputer at that station detects a fault in that part.

6. A system according to claim 2, comprising a respective means at each said station, for permitting a first of said stations in said circuit to receive power from and communicate with said controller when its circuit breaker is open, and for permitting any other one of said stations in said circuit to receive power from and communicate with the said controller when each said circuit breaker of said other station is open and at least one respective circuit breaker of each of every one of all said stations between said controller and said other station are closed.

7. A system according to claim 6, in which said addressing means is operable firstly to allocate a primary address to any first station in said circuit, to elicit an acknowledging response from said first station, and to thereafter instruct said first station to close one of said at least one a circuit breaker thereof, wherein said addressing means is then enabled to communicate with and allocate primary addresses successively to others of said stations in the circuit, each said primary address providing unique identification of the respective station.

8. A system according to claim 7, in which, prior to the allocation of each said primary address, said addressing means sends a signal to the respective one of said stations, said signal including one of said common addresses, in order to elicit from said respective station an acknowledging response to said signal with the common address.

9. A system according to claim 7, said means at each said station being operable, after said allocation of a primary address to that station and prior to the allocation of a primary address to the next station, to send a signal to the controller confirming the allocation of that primary address to that station.

10. A system according to claim 7, in which each said said acknowledging response elicited determines that only the respective station has been allocated the respectivve primary address, by comparing the voltage at said respective parts of said circuit at each side of said at least one circuit breaker of said station.

11. A system according to claim 10, in which said microcomputer of each said station incorporating one of said sensors with an analog signal has a plurality of analog channels, each said channel being programable to perform a regular analog-to-ditial conversion and having a programable threshold, said controller is operable on start-up to allocate a conversion rate and a threshold value to each channel and thereafter is operable to request the digital value of selected conversions on a channel by channel basis, and each said digital value having being stored in the station microcomputer as a reference values associated with the respective channel.

12. A system according to claim 2, in which said controller is programmed to determine if one of said events has occurred at any one or more of said stations by a fast search routine that repeatedly addresses all the stations with a combination of a common address and a successively different selected numerical command, the microcomputer of each station being programmed to respond only (1) if at least one of said events has occurred as determined with its at least one respective detector and (2) if a predetermined result is obtained from a predetermined logic comparison by the microcomputer between each respective one of said different selected numerical commands and said primary address of that station.

13. A system according to claim 12, in which the microcomputer of each said station is programmed to recognise each respective one of said events at a respective one of more than one level of priority, and the controller is programmed so that the fast search routine identifies the stations in order of event priority.

14. A system according to claim 1, in which said circuit is a two-wire circuit comprising two wires, each said station being connected across said two wires, and each said circuit breaker and each said part of said circuit is comprised in a first of said two wires of said two-wire circuit.

15. A system according to claim 1, in which said circuit includes at least one T-junction, each said T-junction being at a respective one of said stations at which said circuit divides to further connect to two respective ones of said adjacent stations, each said station at each said T-junction incorporating at least two of said circuit breakers for selectively disconnecting each of at least two respective ones of said parts of the circuit operationally from a further respective one of said parts of said circuit, to isolate that station from at least one of said two adjacent stations if the microcomputer at that station detects a fault corresponding to a respective one of said at least two parts.

16. A system according to claim 1, comprising at least predetermined ones of said sensor outputting respective analog signals, said microcomputer of each respective one of said stations including at least one respective analog channel programmable to perform a regular analog-to-digital conversion from said analog signal output from the respective sensor therein, each said channel having a respective programmable threshold, and means in said controller operable on start-up to allocate a conversation rate and a threshold value to each said channel, and thereafter operable to request a respective digital value of selected ones of said analog-to-digital conversions on a channel by channel basis, each said value being stored in said microcomputer of the respective station as a reference value associated with the respective channel.

17. A system according to claim 16, in which the analog output of each respective sensor continues to be monitored by the station microcomputer at the conversion rate and a predetermined intervals, each value thereof being compared with the respective stored reference value, wherein if the absolute difference between said values is not less than the respective programmed threshold, indicating that one of said events may have occurred at the station, this is registered by the controller upon its next interrogation of the station.

18. A system according to claim 16, in which the microcomputer of each said station has a buffer memory associated with said at least one analog-to-digital conversion channels thereof, wherein the values of the conversions thereon are stored in digital form, the oldest stored values being lost from said buffer memory as the newest value is written into it, so that the controller has access to a series of readings immediately proceeding and immediately following detection of each said event.

19. A system according to claim 1, in which during regular interrogation of the respective ones of said parts of said circuit by said stations the length of time that any signal different from a predetermined signal exists in a respective part of said circuit is monitored to determine if a short circuit fault has occurred, and after detection of any short circuit fault by all of said stations the circuit breakers of all of said stations are opened and then upon initiation by said controller are successively closed, the effect of each closure at each said station being monitored by the microcomputer of that station, until the station adjacent the fault is reached when its circuit breaker is opened to isolate the fault.

20. A system according to claim 1, in which said controller supplies power to said circuit in a selected number of states, one of said states being a high current state during which said controller sends signals to said stations, and a one of said states of said controller being such that it supplies current to each respective one of said stations via said circuit from a negative resistance source, said further state being used by said controller to receive signals from said stations.

21. A system according to claim 1, in which the circuit includes at least one loop having each of two endsconnected to a separate respective driving device comprised in said controller, to permit each said loop to be selectively energized from each end thereof.

22. An information transmission system comprising:
- a circuit,
- a plurality of stations connected in parallel with one another in said circuit,
- at least one sensor in each said station to convert a respective physical parameter at each said station to a respective electrical signal,
- a controller connected to said circuit, said controller including a driving device to supply power via said circuit to energize said sensors,
- at least one circuit breaker in each of at least two of said stations, each said circuit breaker of each said station being connected in series in said circuit for breaking a respective part of the circuit to isolate that part from an adjacent part of said circuit, and
- a microcomputer comprised in each said station and powered from said controller via said circuit, said microcomputer controlling at least one of said circuit breakers in its respective station, wherein:
- said microcomputer in each said station is arranged periodically to monitor, interpret and store information derived from each respective sensor in that station, and to determine from said information if a significant event has been detected by said sensor;
- said controller is arranged to interrogate all of said stations to identify each one of said stations at which a significant event has occurred, to analyze data relating to each such event and to generate and send corresponding instruction signals to said microcomputers in all of said stations; and
- said microcomputers in all of said stations periodically monitor a respective one of said parts of said circuit adjacent to the respective station and, upon detecting a condition characteristic of a short-circuit fault, open each said circuit breaker of the respective station which, upon initiation by the driving device, are then successively closed by their associated microcomputers until the fault is reached, whereupon the most recent one of said circuit breakers is closed is reopened by its associated microcomputer to isolate said short-circuit fault.

* * * * *